United States Patent [19]

Geringer

[11] Patent Number: 4,745,746
[45] Date of Patent: May 24, 1988

[54] POWER CONTROL FOR A HYDROSTATIC TRANSMISSION

[75] Inventor: Kerry G. Geringer, Gilbert, Iowa

[73] Assignee: Sundstrand Corporation, Rockford, Ill.

[21] Appl. No.: 106,919

[22] Filed: Oct. 6, 1987

Related U.S. Application Data

[63] Continuation of Ser. No. 899,562, Aug. 22, 1986, abandoned.

[51] Int. Cl.⁴ .............................................. F16D 31/02
[52] U.S. Cl. ....................................... 60/447; 60/449; 417/216
[58] Field of Search ......................... 60/445, 447, 449; 417/219

[56] References Cited

U.S. PATENT DOCUMENTS

| | | | |
|---|---|---|---|
| 3,635,021 | 1/1972 | McMillen et al. | 417/213 X |
| 3,650,108 | 3/1972 | Isaac . | |
| 3,672,166 | 6/1972 | Isaac . | |
| 3,693,349 | 9/1972 | Morris . | |
| 3,788,063 | 1/1974 | Kempson | 60/431 X |
| 3,803,843 | 4/1974 | Wyman et al. | 60/431 X |
| 3,805,676 | 4/1974 | Hamma | 91/506 |
| 3,866,420 | 6/1975 | Appel | 60/445 |
| 3,886,742 | 6/1975 | Johnson | 60/488 |
| 3,908,377 | 9/1975 | Riedhammer | 60/445 |
| 3,932,993 | 1/1976 | Riedhammer | 60/431 |
| 3,946,560 | 3/1976 | McIntosh | 60/421 |
| 3,946,561 | 3/1976 | Riedhammer | 60/445 |
| 3,964,262 | 6/1976 | Patton | 60/447 |
| 3,986,358 | 10/1976 | Hoffmann | 60/449 X |
| 3,996,743 | 12/1976 | Habiger et al. | 60/431 |
| 3,999,387 | 12/1976 | Knopf | 60/444 |
| 4,017,215 | 4/1977 | Butler | 60/447 X |
| 4,050,247 | 9/1977 | Connett | 60/444 |
| 4,074,955 | 2/1978 | Nonnemacher | 417/218 |
| 4,116,002 | 9/1978 | Knapp | 60/445 |
| 4,168,612 | 9/1979 | Nikolaus | 60/431 |
| 4,189,921 | 2/1980 | Knapp | 60/445 |
| 4,203,712 | 5/1980 | Uehara | 60/447 X |
| 4,216,656 | 8/1980 | Hamma | 60/445 |
| 4,285,195 | 8/1981 | Budzich | 60/450 |
| 4,292,805 | 10/1981 | Acheson | 60/450 |
| 4,330,991 | 5/1982 | Budzich | 60/427 |
| 4,365,473 | 12/1982 | Schexnayder | 60/447 |
| 4,398,869 | 8/1983 | Kirkham | 60/449 X |
| 4,400,935 | 8/1983 | Louis | 60/431 |
| 4,476,680 | 10/1984 | Pollman et al. | 60/444 |
| 4,479,349 | 10/1984 | Westveer | 60/420 |
| 4,510,750 | 4/1985 | Izumi et al. | 60/443 |
| 4,530,416 | 7/1985 | Kassai | 180/307 |
| 4,531,367 | 7/1985 | Backe et al. | 60/447 |
| 4,553,626 | 11/1985 | Kazmiezrczak | 60/431 X |
| 4,571,940 | 2/1986 | Wuchenauer | 60/444 |

OTHER PUBLICATIONS

SAE Paper 851,505, Strommel & Sticklin–"An Automotive Type Hydrostatic Transmission Control".

*Primary Examiner*—William E. Wayner
*Attorney, Agent, or Firm*—James A. Wanner; Trevor B. Joike; Harold A. Williamson

[57] ABSTRACT

The present invention is directed to a power control for an automatic transmission which consists of two valves, the first of which is a characteristic valve providing a pressure differential linearly proportional to an input speed signal provided by a prime mover driven fixed displacement pump, and a second valve which is modulated by the pressure differential generated by the first valve and by a pressure feedback proportional to the torque transmitted by the transmission. The power control provides a series of linear control curves proportional to input speed and is useful as either an automotive type control or an anti-stall control, or a combination of both.

13 Claims, 4 Drawing Sheets

POWER CONTROL FOR A HYDROSTATIC TRANSMISSION

This is a continuation of co-pending application Ser. No. 06/899,562 filed on Aug. 22, 1986, now abandoned.

FIELD OF THE INVENTION

The field of the present invention is a hydraulic control circuit utilized with a variable displacement hydrostatic transmission and responsive to a hydraulic signal representing the input speed to the transmission to automatically modulate the transmission displacement. This is particularly useful in automotive type controls wherein the input speed signal is used to increase hydrostatic pump displacement, and/or reduce motor displacement, to increase the transmission output speed in proportion to input speed increases above a predetermined minimum rpm. The control is also useful in an anti-stall control where pump displacement is decreased, and/or motor displacement is increased, as prime mover rpm drops below a predetermined rpm indicating overloading of the prime mover.

BACKGROUND OF THE INVENTION

There have been various single valve controls for use in either an automotive type control or an anti-stall control for a prime mover driven hydrostatic transmission. The term automotive type control, when used relative to hydrostatic transmissions, refers to a displacement control which is responsive to pump input speed, and thus driving prime mover speed, to gradually increase the transmission ratio as prime mover speed increases above a predetermined rpm such as engine idle. In one previous automotive control taught in a paper numbered 851505 entitled, "An Automotive Type Hydrostatic Transmission Control", by Peter J. Strommel and Charles Sticklin, a single speed sensing valve, also referred to as a type DA Automotive Style Cartridge Valve, utilizes the $\Delta P$ generated across a fixed orifice to position a valve spool in response to flow from an input speed pump. This valve also has output feedback applied against a lesser area to provide a multiplication gain in output relative to speed pump flow generated $\Delta P$. The output of the speed sensing valve is used to operate a swashplate servo mechanism in response to engine speed. The particular construction of the cartridge valve taught in this 851505 article makes it impossible, or at least difficult, to manufacture and assembly the valve. Furthermore, since the flow is generated across a fixed orifice, the generated $\Delta P$ is not linear, and thus does not provide a linear output.

Another example of an automotive control is taught in U.S. Pat. No. 3,986,358 issued to Helmuth Koffmann on Oct. 19, 1976 wherein the displacement control flow to both the variable displacement pump and a variable displacement motor in a transmission are controlled by generated input speed pump flow across a manually controlled (gas pedal) variable orifice. As the $\Delta P$ across the variable orifice increases, a bleed valve from the control line is gradually closed to increase the pressure to the servo mechanisms. This particular control has no feedback, generates no gain in the power control, and furthermore does not provide a linear control relationship between speed pump flow and hydraulic unit displacement since there is no pressure control of the size of the variable orifice.

It is also known in anti-stall controls to use a fixed displacement pump to provide a hydraulic speed signal which is sensed across an orifice to generate a $\Delta P$ to destroke the hydrostatic transmission pump to reduce prime mover load. This may be done by applying the anti-stall signal to move the displacement control valve as taught in U.S. Pat. No. 3,946,560 issued to McIntosh et al on Mar. 30, 1976. U.S. Pat. No. 3,803,843, issued to Wyman et al, on Apr. 16, 1974, teaches using a fly weight valve to generate a speed signal which is applied against an accelerator adjusted spring force to position a govenor valve to modulate servo control pressure and also is applied against a spring and feedback biased pressure regulator valve which acts as a gain amplifier and provides charge supply to the govenor valve. In various control stages, this control provides both automotive type and anti-stall functions, but requires three valves and the flow generated $\Delta P$ does not provide a linear control curve.

SUMMARY OF THE INVENTION

The present invention is directed to a power control for a hydrostatic transmission in which a pair of control valves, the first being a characteristic valve and the second being a modifier valve, are connected in series relationship to conduct a modified input speed signal generated by a fixed displacement pump to a displacement servo mechanism for controlling hydrostatic transmission speed ratio. The characteristic valve acts as a spring biased variable orifice to provide a $\Delta P$ having a linear characteristic proportional to increasing input speed pump flow, and thus prime mover rpm. The $\Delta P$ generated by the characteristic valve and control feedback are utilized to position the modifier valve which controls the flow to the servo mechanism. In the preferred form, the modifier valve feedback is compared to case pressure and provide a multiplication or amplification gain in the output signal.

Such power control, when utilized in an automotive type control system, provides a rising linear curve characteristic for increasing pump displacement as prime mover speed increases so that the control system is responsive to prime mover rpm. By simply adjusting the spring preload of the characteristic valve, the predetermined pressure at which the speed signal flows to the displacement control servo can be modulated.

Since the characteristic valve operates as a variable orifice with pressure feedback rather than a fixed orifice the $\Delta P$ generated across the characteristic valve will be substantially linear rather than parabolic as would be normal for the flow generated $\Delta P$ across a fixed orifice. This linear $\Delta P$ signal is then applied across the modifier valve with output feedback to provide the desired gain and reference change to tank pressure.

When such power control is utilized in the anti-stall system, the control also provides a relatively steep linear curve characteristic which is used for decreasing pump displacement as prime mover speed decreases so as to reduce the transmission load on the prime mover as a stall condition approaches.

The term power control is utilized since the control, in both the anti-stall configuration and automotive configuration, controls transmission displacement relative to both a prime mover input speed and the torque absorbed by the transmission. Increased torque load on a hydrostatic transmission, and thus increased pressure in the system, generates swashplate moments which tend to destroke the variable displacement pump. When used as an anti-stall control, the control backs off pump displacement until the torque absorbed by the transmission, which is proportional to the power absorbed by the transmission, is equal to the torque available from the prime mover, which is proportional to the power available from the prime mover. When used in an automotive control, the control is both input speed responsive due to the input speed signal and torque responsive because of the destroking swashplate moments. Thus, the control regulates power of the transmission as a function of input speed, taking into account changing torque loads.

It is also an object of the present invention to provide relatively simple characteristic and modifier valves which are easy to assemble, inexpensive to produce and which are adjustable so as to control the point that the control pressure modulates hydraulic unit displacement.

A further object of the present invention is to provide power control for a hydrostatic transmission which has a pair of hydraulic units at least one of which being of variable displacement, and the variable displacement hydraulic unit has a hydraulic servo mechanism for varying the displacement thereof. The hydrostatic transmission furthermore has a fixed displacement speed signal pump driven at a speed proportional to the input speed of the transmission and provides a hydraulic input speed signal. The power control comprises first and second valves in series relationship between the speed signal pump and the servo mechansim. The first valve is a variable orifice valve which is spring biased toward a closed position and biased by the input speed signal toward an open position to establish a pressure drop having a generally linear relationship to the input speed signal. The second valve is spring biased toward a closed position relative to communicating the output of the first valve to the servo mechanism and has first and second opposed pilots connected across the first valve so that the input speed signal induced pressure drop biases the second valve toward an open position. The second valve also has an output feedback proportional to pressure in the servo and connected to a third pilot biasing the second valve toward the closed position.

It is also an object of the present invention to provide a valve for use in a hydraulic circuit control which has a housing providing an elongated housing bore and an axial moveable valve spool slidable within the housing bore. The valve spool has an internal bore with a central member. The valve housing bore is sealed at each end to form with opposite ends of the spool first and second housing pilot chambers. A pair of axially fixed pistons extend from the housing ends so as to be received one in each end of the internal bore and forming with the central member first and second pilot chambers. The first and second housing pilot chambers are in fluid communication with a pair of pressure signals generating a first ΔP across the valve spool. The output of the valve is modulated by a pair of lands located on the valvespool. A radial opening through the valve spool between the pair of lands communicates one of the inner pilot chambers with the valve output to provide output feedback.

BRIEF DESCRIPTION OF PREFERRED EMBODIMENTS

Figure 1:
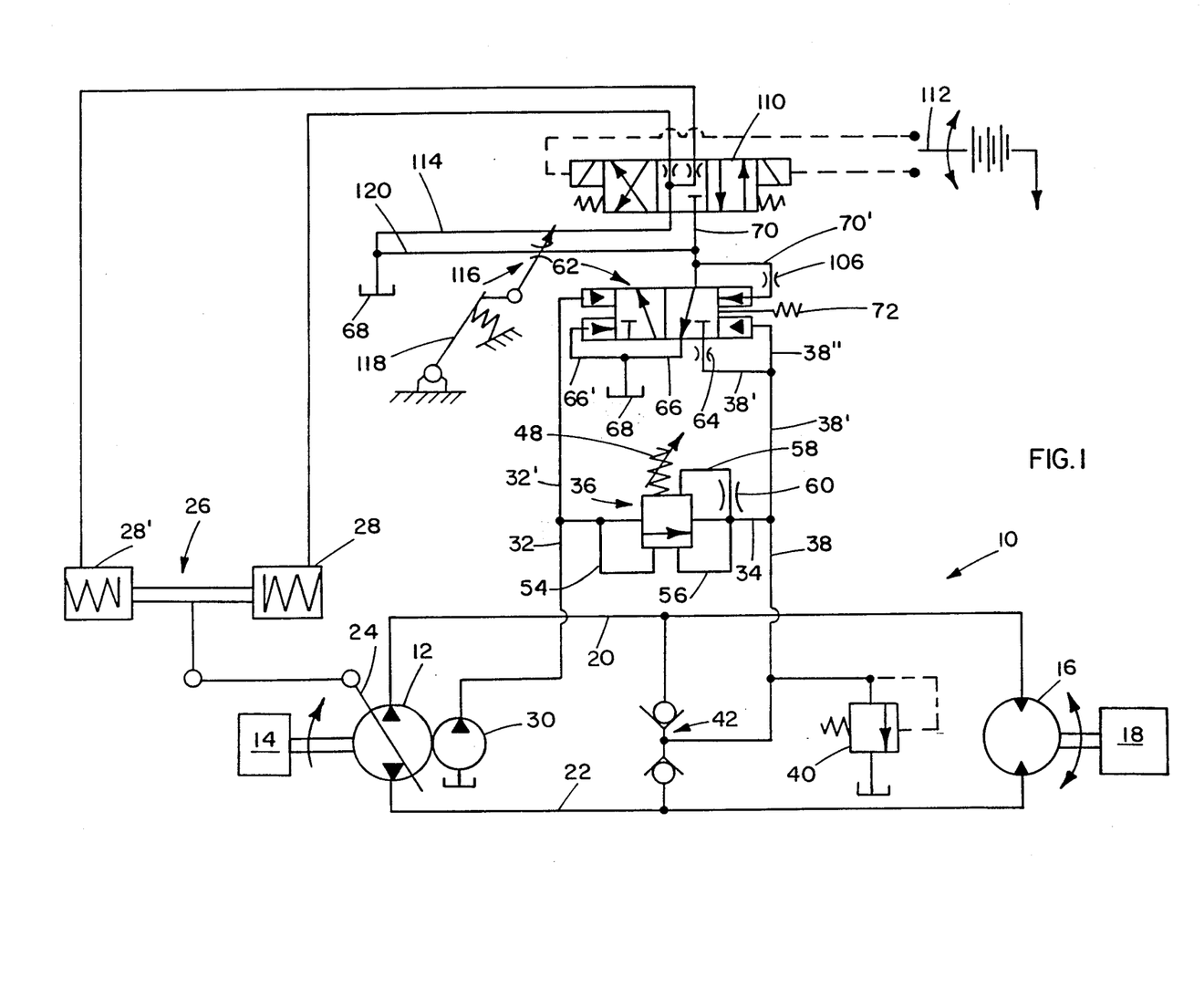
FIG. 1 is a schematic diagram showing the power control of the present invention as used in an automotive type control.

The present invention is directed to a power control as would be utilized in a hydrostatic transmission such as the transmission 10 of FIG. 1. The transmission consists of a pair of hydraulic units such as a pump 12 driven by a prime mover 14 and motor 16 driving a load 18. The pump 12 and motor 16 are interconnected by a pair of hydraulic lines 20 and 22 so as to form a closed hydraulic main loop. The pump 12 is of the reversible variable displacement type as diagramatically shown to include a swashplate 24 operated by a spring centered servo mechanism 26 including a pair of piston/cylinder arrangements 28 and 28'. The position of the swashplate 24 determines the amount and direction of flow from the pump 12 to the motor 16 so as to provide a reversible drive of the load 18. While the motor 16 is shown to be fixed displacement, it could also be a variable displacement hydraulic unit in staged control relationship with the pump 12 so that the motor goes from maximum displacement to minimum displacement after the pump 12 has reached maximum displacement in either direction. The control of the present invention could also provide control fluid to a servo mechanism for the motor if of the variable displacement type but for purposes of simplicity, the controls only shown to control pump displacement. Such variable displacement hydrostatic transmissions utilizing various types of hydraulic units are well known and need not be described in greater detail relative to understanding the concepts of the present invention.

As is also quite typical in hydrostatic transmissions a fixed displacement charge pump 30, which as used in the present invention is also an input speed pump, is used to provide both a source of control fluid and make-up fluid for the main loop. The pump 30, since it is also to be utilized to provide a speed signal is driven at a speed equal to, or directly proportional to, the rpm of the prime mover 14. The flow from the pump 30 proceeds through line 32, line 34 including a characteristic valve 36 to be described in detail later, and line 38 to a charge relief valve 40 and a pair of check valves 42. Thus the pump 30 provides make-up fluid to either main loop line 20 or 22, depending on which side is the low pressure side of the main loop, as is well known in the prior art.

Characteristic valve 36 acts as a variable orifice. As fluid flows through an orifice a pressure drop is generated proportional to the volume of flow through the orifice. Since the pump 30 of fixed displacement and driven proportional to prime mover rpm, the pressure drop, or ΔP, across the orifice will also be proportional to engine rpm. However, the relationship between flow through a fixed orifice and ΔP is a parabolic relationship while the relationship between the flow through a properly designed variable orifice and its ΔP could be made substantially linear. The characteristic valve 36 of the present invention is so designed to provide this linear relationship.

Figure 2:
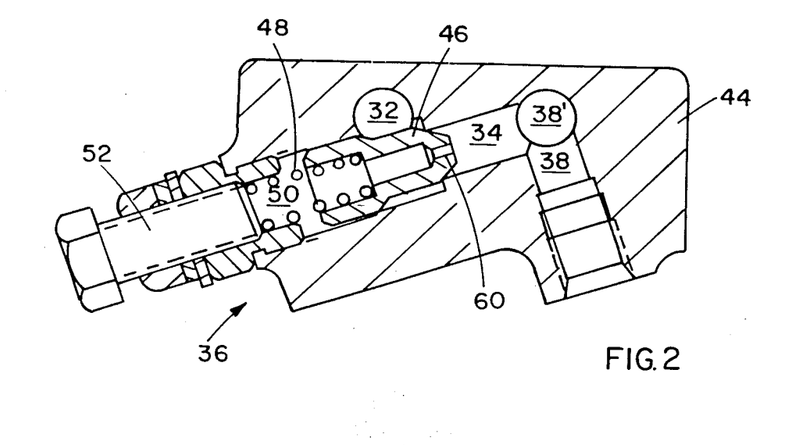
FIG. 2 is a sectional view of the characteristic valve used in the power control.

The details of the characteristic valve 36 are shown in FIG. 2. The characteristic valve has a housing 44 containing a stepped bore 34 which is represented by the line 34 in the schematic of in FIG. 1. The large diameter portion of the stepped bore 34 is connected to the line 32 while the small diameter portion of the bore 34 communicates with a pair of passages 38 and 38' represented by lines 38 and 38' in FIG. 1, the purpose of the latter being described in detail below. Located at the step in the bore 34 is a tapered poppet 46 biased toward the step by a spring 48 located in spring chamber 50. The bias of spring 48 on the poppet 46 can be adjusted or varied by the typical threaded adjustment means 52. While the spring 48 biases the poppet 46 toward the closed position, the pressures of lines 32 and 38 bias the poppet toward the open position. The pressure in line 32 applied at the larger diameter portion of the stepped bore 34 acts on the outer portion of the poppet 46 to provide an opening bias on the characteristic valve as represented by line 54 in FIG. 1. The pressure in line 38 is supplied against the inner diameter portion of the poppet 46 as represented by line 56 in FIG. 1 and also biases the characteristic valve 36 toward an open position. Aiding the spring bias and moving the poppet 46 toward the closed position is a restricted pilot pressure applied through a restrictive orifice 60 in the poppet communicating the pressure of line 38 with the spring chamber 50, and thus the backside of the poppet 46. This is represented by line 58 in FIG. 1. The communication between line 38 and the spring chamber 50 could also be through a separate passageway provided in the characteristic valve housing 44 and such passageway would also include a restrictive orifice such as 60. It is noted that under stable conditions when there would be substantially no flow through the orifice 60, and thus spring chamber 50 would be at the same pressure as line 38, the net effect of the pressure of line 38 is to bias the poppet toward the closed position since the area of the poppet valve at spring chamber 50 is larger than the small diameter portion of the stepped passage 34. The net effect of the spring 48 bias and the three pilot biases on the poppet is to modulate the position of the poppet 46 relative to the stepped portion of the bore 34 to provide a small annular gap therebetween. This annular gap forms the variable flow orifice between line 32, and thus the speed signal pump 30, and line 38. When the prime mover is driving pump 30 there will always be some flow through the small annular gap generating a ΔP representative of prime mover rpm between line 32 at the input speed signal pressure and line 38 at the characteristic valve output pressure, which could also be referred to as the conditioned signal. Due to the charge relief valve 40, the conditioned signal is normally at a preset pressure, which when combined with the characteristic valve flow generated ΔP, establishes the pressure in line 32 or the input speed signal pressure. Furthermore, since this small annular gap is a variable orifice with the appropriate pilot pressures, the ΔP across the characteristic valve 36 is linearly proportional to prime mover rpm.

Downstream, in a supply relationship sense, from the characteristic valve 36 is the second valve in the power control, that is a modifier valve 62 which is in flow communication with the outlet side of the characteristic valve by means of the previously mentioned line 38'. An orifice 64 is located in line 38' to restrict the flow through the modifier valve 62 since only a limited amount of flow will eventually be necessary to operate the servo mechanism 26. Also connected to the modifier valve is a tank line 66 in fluid communication with a tank or reservoir 68 at atmospheric pressure. The outlet of the modifier valve 62 is connected to a line 70 which provides a control signal which is applied to one of the servo cylinder arrangements 28 and 28' of the servo mechanism 26. Modulation of the modifier valve 62 selectively connects the output line 70 with conditioned pressure as applied from line 38 and 38' through orifice 64 or with tank through line 66.

Figure 3:
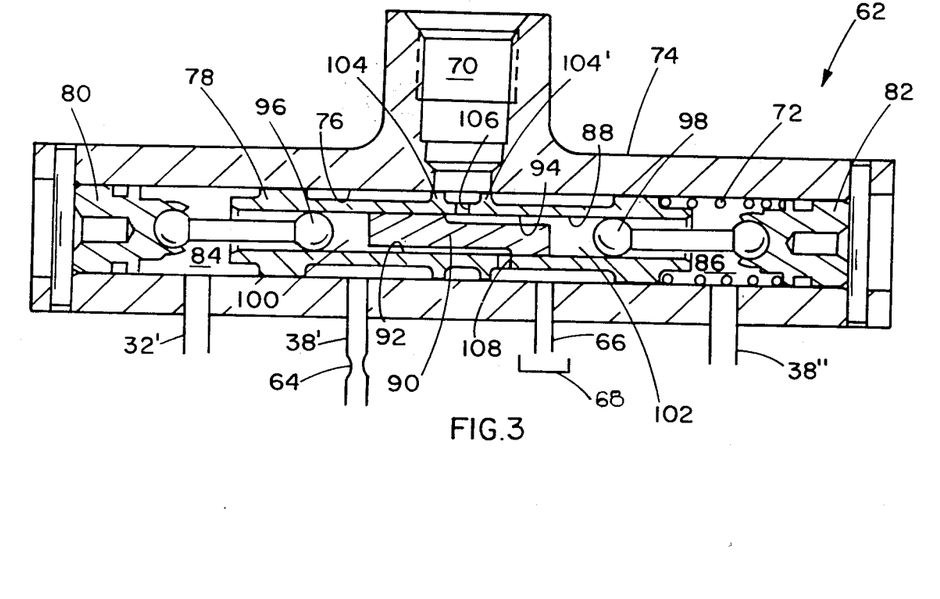
FIG. 3 is a sectional view of the modifier valve used in the present invention.

The modifier valve 62 is selectively positioned by a modifier valve spring 72 and four pilots schematically shown in FIG. 1 and shown in constructional detail in FIG. 3. The modifier valve has a housing 74 with elongated bore 76 extending the length thereof. Located within the bore 76 is an axially moveable valve spool 78. Located one at each end of the elongated housing bore 76 are plugs 80 and 82 which form with the respective ends of the valve spool 78 housing pilot chambers 84 and 86 which are respectively connected to lines 32' and 38" shown in FIG. 1.

The valve spool 78 has an internal bore 88 with a central plug 90 fixed to the valve spool 78. The central plug has two machine flats which form axially extending passageways 92 and 94, the purpose of which will be explained below. Axially positioned relative to the valve housing 74 are a pair of dumbbell shaped pistons 96 and 98 which extend into the open ends of the valve spool internal bore 88 so as to form inner bore pilot chambers 100 and 102. Centrally located on the valve spool are a pair of lands 104 and 104' which modulate the fluid communication between the modifier valve outlet 70 and either the input of line 38' or drain 68. Located between the pair of lands 104 and 104' is a radial passage 106 which connects with the previously mentioned axial passage 94 to provide fluid communication between the outlet 70 and the inner bore chamber 102. This fluid communication, schematically shown as line 70' and orifice 106 in the schematic of FIG. 1, provides a feedback between the valve output of line 70 and the inner bore chamber 102 closed by piston 98. Similarly, inner bore chamber 100 is in fluid communication with drain through axial passage 92 and a radial passage 108 formed in the valve spool outboard of land 104'. This is schematically shown in FIG. 1 as line 66' connecting with line 66 and tank 68.

The particular structure of the modifier valve 62 described above provides an inexpensive construction which is simple and easy to manufacture. It also provides a modifier valve wherein the output has a multiplication or amplification in gain relative to a primary input signal consisting of a first ΔP applied at the pilot chambers 84 and 86, particularly since inner bore chamber 100 is referenced to tank 68. For example, if the diameter of the housing bore 76 is twice the diameter of the internal bore 88, the primary input signal ΔP is applied against an area four times the area of the inner bore minus the area of the inner bore 88 while the output pressure feedback of chamber 102 is applied against the area of the internal bore 88. This results in an output multiplication gain of 3:1.

The position of the valve spool 78 is modulated by a combination of forces consisting of the spring force of spring 72 located in chamber 86, the first ΔP applied at the housing pilot chambers 84 and 86 and a second ΔP at inner pilot chambers 100 and 102. Since the first ΔP is the pressure drop across the characteristic valve 36 applied through lines 32' and 38", the valve spool 78 position is linearly proportional to the prime mover 14 input speed once the force of spring 72 is overcome. For example, the spring 72 has a sufficient force biasing the valve spool 78 to the left to require a minimum first ΔP of 30 psi to start to move the valve spool 78 toward the right to permit flow from line 38' past land 104 to the valve outlet 70. Once the outlet 70 is so pressurized, there is a pressure feedback signal applied through orifice 106 to the inner bore chamber 102 tending to move the valve spool toward the left in addition to the spring force of spring 72. This valve construction provides an output pressure in line 70 which is greater than the control first ΔP by a multiplication factor, such as 3:1 in the example presented above.

The modulated control signal at line 70 is then applied to one of the servo cylinders 28 or 28' as selected by a solenoid operated forward-neutral-reverse (F-N-R) valve 110 schematically shown in FIG. 1 and controlled by an electrical input signal from switch 112. The other of the servo cylinders 28 or 28' is connected to tank 68 through the F-N-R valve 110 and line 114. The F-N-R valve 110 merely selects the direction of operation while the amount of swashplate displacement is controlled by the power control consisting of the characteristic valve 36 and the modifier valve 62 as modulated in response to pump 30 rpm. Since line 70 is connected to the stroking servo cylinder 28 or 28' through the F-N-R valve 110, the feedback pressure in the pilot line 70' of modifier valve 62 is proportional to the main loop pressure moments destroking pump 12 and sensed by the servo mechanism 26. This makes the power control of the present invention both input speed and torque responsive.

An additional feature that may be provided is an inching valve which consists of a variable orifice 116 controlled by a foot pedal 118 and located in line 120 extending between a modifier valve output line 70 and tank 68. The inching valve 116 is normally closed, but when it is decided to manually override the automotive control to provide slow speed operation, the inching valve 116 is gradually opened to bleed pressure from line 70 to tank.

By automotive type control it is meant that the transmission ratio is responsive to prime mover input speed as set by the engine throttle whose position is determined by the vehicle operator. Prime mover rpm causes the speed signal pump 30 to provide flow across characteristic valve 36 to establish the first Δfor the modifier valve 62. Operation of the automotive control can best be understood by viewing the graph of FIG. 4 teaching the relationship between pump displacement versus pump speed.

Figure 4:
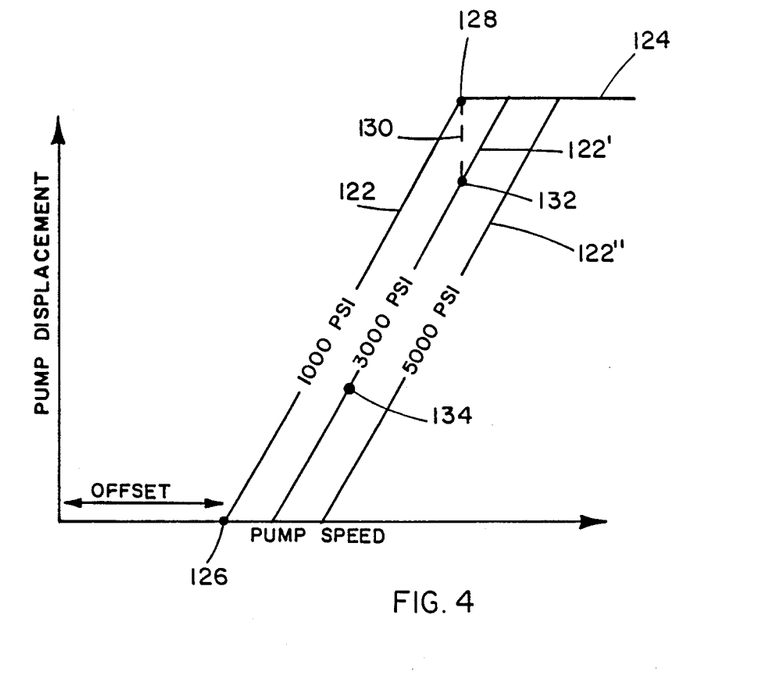
FIG. 4 is a graph showing the relationship between pump displacement and pump input speed when the power control is used an automotive type control.

Below a given prime mover rpm, such as engine idle, it is desirable to have zero pump displacement so that there is zero flow in the transmission main loop and no transmission load is applied on the prime mover 14. Thus, as indicated in FIG. 4 there is an offset to prevent pump displacement until a predetermined engine rpm is reached. This offset is established by the aforementioned modifier valve spring 72 which prevents movement of the modifier valve spool 78 to the right until a predetermined first ΔP is established. For example, the spring 72 provides a sufficient force to prevent movement of the valve spool 78 until a first ΔP of 30 psi is established across the characteristic valve 36 representing the desired minimum prime mover speed. As prime mover speed increases above this predetermined rpm, further speed increases increase the ΔP across the characteristic valve 36 above 30 psi, such ΔP having a linear relationship with engine speed as described above, to provide a linear increase in control flow from line 38 through the modifier valve 62 to the servo mechanism 26. This linear characteristic is shown by the rising lines 122, 122' and 122" of FIG. 4 which increase until maximum pump displacement is reached as indicated by line 124.

The slope of the lines 122 through 122" are determined by the spring characteristic of spring 48 of the characteristic valve 36. When the power control of the present invention is used for an automotive type control, the spring 48 has a relatively soft spring characteristic (when compared to an anti-stall type control described below) in order to provide a gradual slope to the lines 122 through 122". It is also noted that adjustment of the characteristic valve spring 48 by the threaded adjustment mechanism 52 can also modify the amount of offset established by the fixed spring 72 of the modifier valve 62. Since the spring 48 determines the slope of the linear curve established by the characteristic valve 36, the amount of engine rpm necessary to establish a sufficient first ΔP to overcome the force of spring 72, 30 psi in the example given, the point of control start-up such as point 126 in FIG. 4 can be modified. Thus, adjustable spring 48 in conjunction with fixed spring 72 establish the amount of offset.

The three lines 122, 122' and 122" represent three pressure curves for the transmission which occur due to increased torque creating higher pressures in the main loop which tend to destroke the variable displacement pump 12. These three linear curve represent main loop pressures of 1000, 3000 and 5000 psi respectively. Transmission torque is proportional to pump displacement times main loop pressure while transmission power is proportional to transmission torque times pump speed. Thus, as torque loads on the transmission vary, and therefor the prime mover load varies, the power control must balance main loop pressures, pump displacement, and pump speed to prime mover input torque. For example, if the prime mover and transmission are driving a load in stable condition at maximum pump displacement and 1000 psi main loop pressure, represented by point 128 in the graph of FIG. 4, and then the load 18 increases so as to increase main loop pressure to 3000 psi causing destroking pump moments, pump displacement follows the vertical dotted line 130 until the 3000 psi curve 122' is reached as at point 132. It is noted that points 128 and 132 are at the same pump speed, and therefore constant prime mover speed. Line 130 represents a torque control portion of the control curve under increasing load torque. Since the main loop pressure increase between point 128 and point 132 is proportionally greater than the decrease in pump displacement, transmission operation at point 132 would represent an increased torque load on the prime mover 14. This would cause a decrease in prime mover speed following the curve 122' until point 134 is reached representing a balance between prime mover rpm and thus pump speed, main loop pressure, and pump displacement so the actual power consumption at point 134 is approximately equal to the power consumption of point 128. The control curve between point 132 and 134 along line 122' upon an increase transmission loading is actually an anti-stall portion of the control curve. The torque control portion and the anti-stall portion actually occur simultaneously and form a gradual smooth curve joining point 128 and point 134 rather than the two linear portions as depicted to graphically represent the understanding of the power control function.

Figure 5:
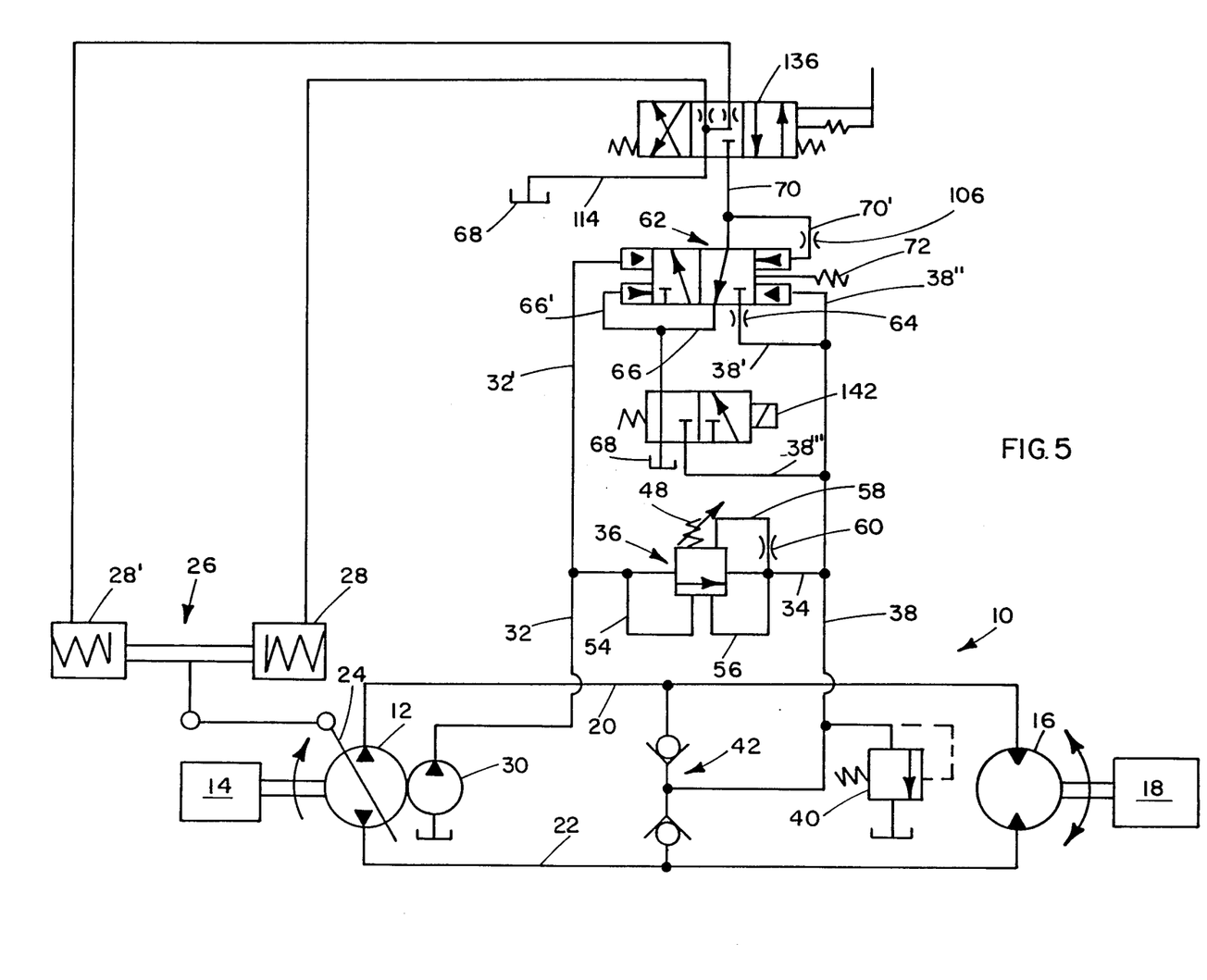
FIG. 5 is a schematic diagram showing the power control of the present invention as used in an anti-stall control.

The power control of the present invention can also be utilized as an anti-stall control for a hydrostatic transmission. This is represented in the schematic of FIG. 5 and the graph of FIG. 6. Where similar parts are utilized, the numbering of the schematic of FIG. 5 is identical to the numbering of the schematic of FIG. 1. Again, the power control utilizes an input speed pump 30 to establish a first ΔP across the characteristic valve 36 to modulate the position of the modifier valve 62 to provide a control signal at line 70. Construction of the characteristic valve 36 and the modifier valve 62 is identical to the construction shown in FIGS. 2 and 3 respectively and explained in detail above relative to the automotive type control. However, in the anti-stall type control the prime mover 14 is generally operated at a fixed preselected speed and pump 12 displacement is controlled by a displacement control valve 136 replacing the F-N-R valve 110 of the automotive type control. The displacement control valve is modulated by operator input which may be of the mechanical, hydraulic or electrical type. Since prime mover rpm is generally constant, a constant first ΔP across the characteristic valve 36 is established generating a fixed pressure at line 70 which is then modulated by the displacement control valve 136 to control the servo mechanism 26 establishing the angle of swashplate 24 and thus pump 12 displacement.

Figure 6:
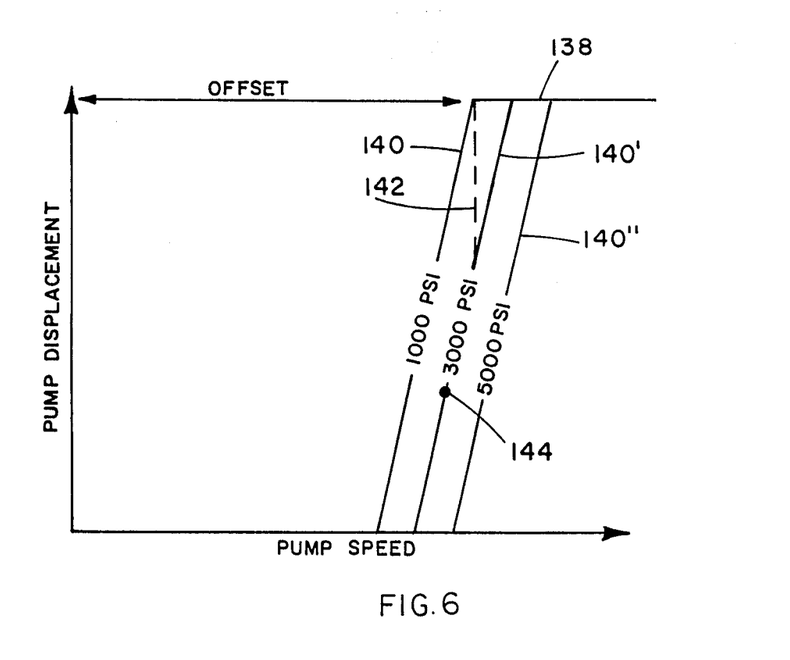
FIG. 6 is a graph showing the relationship between pump displacement and pump input speed when the power control is used as an anti-stall control.

As long as prime mover input torque is equal to or greater than transmission output torque demanded by load 18, the variable displacement pump 12 is at a selected displacement, represented by line 138 in graph of FIG. 6, as established by the operator input to the displacement control valve 136. However, if the torque demanded by load 18 increases above the torque available from the prime mover 14, swash plate moments first reduce the pump displacement such as shown by line 142, and then the load causes the prime mover speed to droop generating a lower speed signal. This reduces the first ΔP across the characteristic valve 36 since the flow from the fixed displacement pump 30 has now been decreased. Since the first ΔP is now lower, the valve spool 78 of the modifier valve 62 is biased toward the left reducing the flow from line 38' to outlet 70 of the modifier valve 62 and thus the available control pressure for the displacement control valve 136. This causes a reduction in the displacement of pump 12 which follows the linear control curves 140, 140' or 140" of FIG. 6 dependent upon the pressure drop across the transmission main loop such as to point 144. Since it is desirable to have a relatively accurate anti-stall control point, that is as a point wherein pump displacement decreases upon prime mover speed droop, the curves 140 and 140" of FIG. 5 are relatively steep when compared to the control curves 122 to 122" of FIG. 4 of the automotive control. The steepness of the anti-stall control curves is obtained by utilizing a relatively stiff spring 48 in the characteristic valve 36. Due to this steepness in the anti-stall curves, an equivalent reduction in pump displacement occurs over a much smaller engine speed droop, and thus greater accuracy is obtained, for the FIG. 6 pure anti-stall control as compared to the engine speed droop for the FIG. 4 automotive type control, even though both controls operate in a similar manner. The anti-stall control backs off pump displacement until the transmission torque absorbed, which is proportional to transmission power absorbed, is equal to the prime mover torque available, which is proportional to the prime mover power available.

It is noted that in the automotive type control it is desired to increase pump displacement as prime mover speed increases above a minimum rpm. Therefore, in the graph of FIG. 4 the offset is shown at zero pump displacement since the modifier valve spring 72 and the adjustment of the characteristic valve spring 48 are established to preselect the start point for increasing pump displacement, such as point 126. However, in the anti-stall control of FIG. 5 and the graph of FIG. 6, prime mover speed is generally fixed and the power control is designed to decrease pump displacement when prime mover rpm droops below the predetermined speed. Thus, in FIG. 6 the offset is shown as preselected at maximum pump displacement even though the offset is still established by the strength of spring 72 of the modifier valve 62 and the adjustment of the characteristic valve spring 48.

An optional feature of the anti-stall control is an override valve 142 which may be added to defeat the anti-stall function. The solenoid operated override valve 142 normally connects line 66 to tank 68 so that modulation of the modifier valve 62 to proportionally controls the pressure at output line 70 between the pressure in line 38' and atmospheric or tank pressure 68. When the solenoid override valve 142 is energized the valve is moved so as to connect line 38 through line 38''' to line 66 so that the output pressure at line 70 is always equal to line 38 pressure regardless of the modulation of the modifier valve 62. Since line 38 pressure is established by the charge relief valve 40, line 70 pressure is substantially constant when the operation of the override valve 142 is selected.

As can be seen from the above, a power control has been established which can provide both an automotive type control function and an anti-stall control function. Furthermore, the primary elements of the power control comprise two valves, a first characteristic valve and a second modifier valve, which are both relatively simple and inexpensive in construction as easy to assemble. Since the characteristic valve acts as a variable orifice responsive to the ΔP generated across the variable orifice and the feedback thereof, the output of the power control is linear in nature providing pump displacement which has a relatively linear relationship to prime mover speed.

It can thus be seen that the present invention, as described above, meets the objectives of providing an inexpensive, easy to assemble, two valve power control which can be used in either an automotive type control or an anti-stall control for a hydrostatic transmission and which provides a linear control function. The preferred embodiments of the power control as specifically described above are illustrative of the concepts of the present invention, but not intended to limit the scope thereof.

I claim:

1. A power control for a hydrostatic transmission having a pair of hydraulic units at least one of which being of variable displacement, said variable displacement hydraulic unit having hydraulic servo means for varying the displacement thereof, said hydrostatic transmission furthermore having a fixed displacement speed signal pump driven at a speed proportional to the input speed of the transmission and providing a hydraulic input speed signal, said power control comprising first and second valves in series flow relationship between said speed signal pump and said servo means, said first valve being a variable orifice valve spring biased toward a cloeed position and biased by the input speed signal toward an open position to establish a pressure drop having a generally linear relationship to the input speed signal, said second valve being spring biased toward a closed position relative to communicating the output of said first valve to said servo means and having first and second opposed pilots connected across said first valve so that the input speed signal induced pressure drop biases said second valve toward an open position, said second valve also having an output feedback proportional to pressure in said servo means and connected to a third pilot biasing said second valve toward the closed position.

2. The power control of claim 1 wherein said second valve has a fourth pilot connected to case and said third pilot acts in opposition to said fourth pilot.

3. The power control of claim 1 wherein said first and second pilots of said second valve member operate on a greater area portion of said second valve than said third pilot so as to provide a multiplication gain in the second valve output signal.

4. The power control of claim 3 wherein the spring bias on said first valve is provided by a spring which is adjustable to modify an offset so that the first valve begins to open at a predetermined input speed and is of a soft spring characteristic so as to provide a gradual opening of said first valve as the input speed signal increases above the predetermined input speed.

5. The power control of claim 4 wherein the output signal of said second valve passes through a direction control valve to said servo mechanism so as to selectively reverse the direction of operation of said variable displacement hydraulic unit.

6. The power control of claim 5 wherein the directional control valve is solenoid operated and has forward, neutral and reverse positions.

7. The power control of claim 3 as used in an anti-stall control wherein a generally fixed speed prime mover provides the input to said transmission and drives said speed signal pump to provide an input speed signal sufficient to maintain said first valve in a fully open position at the rated speed of said prime mover, and wherein a variable displacement control valve is positioned between the output of said second valve and said servo means and is responsive to operator input to provide normal displacement control of said variable displacement hydraulic unit, and wherein said first valve is responsive to a drop in the input speed signal to move toward the closed position to reduce the pressure drop established by said first valve and applied to the first and second pilots of said second valve.

8. The power control of claim 7 wherein said spring bias on said first valve is provided by a spring of stiff spring characteristic so as to provide a steep linear curve relationship between said second valve output and the input speed signal to permit rapid movement toward a closed position of the first valve upon reduction of the input speed signal.

9. The power control of claim 8 wherein said spring is adjustable so as to provide an offset to establish a range input speed curves along which said first valve moves toward the closed position as input speed decreases.

10. A power control for a hydrostatic transmission having a pair of hydraulic units at least one of which being of variable displacement, said variable displacement hydraulic unit having hydraulic servo means for varying the displacement thereof, said hydrostatic transmission furthermore having a fixed displacement speed signal pump driven at a speed proportional to the input speed of the transmission and providing a hydraulic input speed signal, said power control comprising first and second members in series flow relationship between said speed signal pump and said servo means, said first member establishing a pressure differential proportional to the input speed signal, said second member being a valve having a housing providing an elongated housing bore, an axial moveable valve spool slidable within said housing bore, said valve spool having an internal bore and a central member, said valve housing bore being sealed at each end to form with opposite ends of said spool first and second housing pilot chambers, axially fixed piston means extending from the ends of said housing so as to be received one in each end of said internal bore and forming with said central member first and second inner pilot chambers, said first and second housing pilot chambers being in fluid communication with said pressure differential, an output located on said valve housing and modulated by a pair of lands located on said valve spool, and a radial opening through said valve spool between said pair of lands communicating one of said inner pilot chambers with the valve output.

11. The valve of claim 10 wherein the valve spool has a first effective area acted on by said pressure differential which is the area of said housing bore minus the area of said internal bore and has a second effective area acted on by the difference in pressures in said first and second inner pilot chambers which is equal to the area of said internal bore, the ratio of said first effective area to said second effective area being a multiplier whereby the valve is provided with an output gain multiplication equal to said multiplier.

12. The valve of claim 11 wherein the other of said inner pilot chambers is connected to atmospheric pressure.

13. The valve of claim 12 wherein the valve spool is spring biased toward non-centered position by a spring located at a first end of said valve spool, and wherein the connection to atmospheric pressure is a first radial port located in said housing toward said first end of said valve housing, and a second radial port in said valve spool is generally aligned with said first radial port and communicating with an axial passageway in said central member and in communication with the other inner pilot chamber located toward the other end of said valve housing.

* * * * *